United States Patent
Wanibuchi et al.

(10) Patent No.: US 7,394,224 B2
(45) Date of Patent: Jul. 1, 2008

(54) CHARGE CONTROL DEVICE

(75) Inventors: Toru Wanibuchi, Akashi (JP); Toshiyuki Takagi, Ashiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 431 days.

(21) Appl. No.: 10/998,033

(22) Filed: Nov. 29, 2004

(65) Prior Publication Data

US 2005/0134221 A1   Jun. 23, 2005

(30) Foreign Application Priority Data

Dec. 5, 2003   (JP)   ............................ 2003-407233
May 7, 2004   (JP)   ............................ 2004-138226

(51) Int. Cl.
*H02J 7/04* (2006.01)
(52) U.S. Cl. ...................................... 320/149; 320/153
(58) Field of Classification Search ................. 320/133, 320/128, 149, 153; 324/425–433
See application file for complete search history.

(56) References Cited

U.S. PATENT DOCUMENTS

| 5,659,240 A | 8/1997 | King |
| 2002/0060554 A1 | 5/2002 | Odaohhara et al. |
| 2004/0124810 A1 | 7/2004 | Smallwood et al. |

FOREIGN PATENT DOCUMENTS

| EP | 1 246 336 | 10/2002 |
| JP | 4-109831 | 4/1992 |
| JP | 9-163624 | 6/1997 |
| JP | 11-187587 | 7/1999 |
| JP | 2002-51478 | 2/2002 |
| JP | 2003-9406 | 1/2003 |

*Primary Examiner*—Bao Q. Vu
*Assistant Examiner*—Richard V Muralidar
(74) *Attorney, Agent, or Firm*—Wenderoth, Lind & Ponack, L.L.P.

(57) ABSTRACT

A charge control device of a secondary battery that allows the use of an electronic apparatus for a long period using a single initial charging, and is capable of extending battery life. The charging device includes a charge circuit for supplying charging current to secondary batteries, a voltage detection circuit for detecting the voltage of secondary batteries, a current detection circuit for detecting the charging current in secondary batteries, a memory such as an EEPROM for recording the number of times of charging or total charge integrated amount in secondary batteries, and a microcontroller for controlling charge circuit, changing over to constant voltage charge after charging secondary batteries 2 at constant current, and decreasing the voltage in constant voltage charging depending on the number of times of charge or total charge integrated amount recorded in the memory of EEPROM.

6 Claims, 8 Drawing Sheets

CHARGE CONTROL DEVICE

TECHNICAL FIELD

The present invention relates to a charge control device for charging secondary batteries used in personal computer and other electronic appliances.

BACKGROUND ART

Recently, lithium ion secondary batteries were developed as rechargeable secondary batteries, and have been widely used in notebook type personal computers, portable information appliances, digital video camera, digital still camera, mobile telephones and many others.

For charging these lithium ion secondary batteries, various charge control devices have been developed. For example, a device capable of charging plural types of secondary batteries using differing charging methods has been disclosed in Japanese Laid-open Patent Publication No. H11-187587. Japanese Laid-open Patent Publication No. H11-187587 shows a charge control circuit used in both nickel-metal hydride secondary battery and lithium ion secondary battery differing in charging method. In the charging method of lithium ion secondary battery, in the initial stage of charging, the charging current is controlled to be constant, and constant current (CC) charging is done. By this CC charging, when the terminal voltage of the battery reaches a constant voltage, for example, 4.2 V or 4.1 V per cell, the operation is transferred to constant voltage (CV) charging.

Regarding the lithium ion secondary battery, as disclosed in Japanese Laid-open Patent Publication No. 2002-51478, it is known to select the charging condition by an instruction from the operator of the electronic appliance in order to extend the battery life. As shown in this Japanese Laid-open Patent Publication No. 2002-51478, as a characteristic of a lithium ion secondary battery, the filling rate in charging is higher when the charging voltage in CV charging is higher. By one charging operation, the appliance can be used for a long time, but the battery life becomes shorter. When the charging voltage is lower, the battery life is longer, but the filling rate is lower and the appliance can be used for a shorter time by one charging operation.

Japanese Laid-open Patent Publication No. H4-109831 proposes a method of storing the number of times of consecutive charging operations on the basis of information signal of battery remaining capacity from an integrating storage circuit, in order to suppress shortening of life of secondary battery. In order to extend the battery life, it is intended to stop charging when the number of times of consecutive charging operations reaches a specified number of times.

From the standpoint of the manufacturer of electronic appliance, it is desirable to be used for a long time. From the standpoint of user of electronic appliance, a longer battery life is also desired.

It is hence an object of the invention to present a charge control device of a secondary battery so that the appliance can be used for a longer time using a single charging, and the battery life can be extended.

The charge control device of the invention is also provided to address the progress of deterioration of lithium ion secondary battery not only by the number of times of charging, but also by the duration from start of use. Also given that the lithium ion secondary battery deteriorates faster when the battery voltage is higher, it is a further object of the invention to present a charge control device of secondary battery capable of using the appliance for a longer time using a single charging, and also to extend battery life.

SUMMARY OF THE INVENTION

To solve the problems in the prior art, the charge control device in one aspect of the invention comprises a charge circuit for supplying a charging current to a secondary battery, a voltage detection circuit for detecting the voltage of the secondary battery, a current detection circuit for detecting the charging current to the secondary battery, a memory for recording the number of times of charging into the secondary battery or the total charge integrated capacity, and control means for controlling the charge circuit, changing over to constant voltage charging after charging the secondary battery at constant current, and decreasing the voltage in this constant voltage charging depending on the number of times of charging or the total charge integrated capacity recorded in the memory.

Further, in the charge control device in another aspect of the invention, the memory has an area for recording the number of times of full charging, and the control means controls the charge circuit, changes over to constant voltage charging after charging the secondary battery at constant current, and decreases the voltage in constant voltage charging depending on the ratio of the number of times of full charging and the number of times of charging recorded in the memory, or the ratio of the number of times of full charging and the total charge integrated capacity recorded in the memory.

The charge control device in another aspect of the invention comprises a charge circuit for supplying a charging current to a secondary battery, a voltage detection circuit for detecting the voltage of the secondary battery, a current detection circuit for detecting the charging current to the secondary battery, a memory for recording the start time of use of the secondary battery, and control means having a clock function for recording the start time of use of the secondary battery in the memory and controlling the charge circuit, changing over to constant voltage charging after charging the secondary battery at constant current, and decreasing the voltage in constant voltage charging depending on the duration after start of use of the secondary battery.

More specifically, the memory has an area for recording when the voltage of the secondary battery drops below a specified voltage. The control means lowers, maintains or raises the voltage in the constant voltage charging depending on whether or not the voltage of the secondary battery is below the specified voltage within a specified time from recording in the area of the memory for recording when the voltage of the secondary battery drops below the specified voltage.

Moreover, the area of the memory for recording when the voltage of the secondary battery drops below the specified voltage includes areas for recording a first specified voltage of the battery voltage, and a second specified voltage lower than the first specified voltage. The control means lowers the voltage in constant voltage charging when the voltage of the secondary battery does not drop below the first specified voltage within a specified time from recording in the area of the memory for recording when the voltage of the secondary battery drops below the first specified voltage. It maintains the voltage in constant voltage charging when the voltage of the secondary battery drops below the first specified voltage within a specified time.

It further controls to raise the voltage in constant voltage charging when the voltage of the secondary battery drops below the second specified voltage within a specified time from recording in the area of the memory for recording when the voltage of the secondary battery drops below the second specified voltage. The memory also includes an area for recording when the remaining capacity of the secondary battery drops below a specified remainder.

The control means lowers, maintains or raises the voltage in constant voltage charging depending on whether or not the remaining capacity of the secondary battery is below the specified remainder within a specified time from recording in the area of the memory for recording when the remaining capacity of the secondary battery drops below the specified remainder.

In addition, more specifically, the area of the memory for recording when the remaining capacity of the secondary battery drops below the specified remainder includes areas for recording a first specified remainder of the battery voltage, and a second specified remainder lower than the first specified remainder. The control means lowers the voltage in constant voltage charging when the remaining capacity of the secondary battery does not drop below the first specified remainder within a specified time from recording in the area of the memory for recording when the remaining capacity of the secondary battery drops below the first specified remainder, and maintains the voltage in constant voltage charging when the remaining capacity of the secondary battery drops below the first specified remainder within a specified time.

The control means further raises the voltage in the constant voltage charging when the remaining capacity of the secondary battery drops below the second specified remainder within a specified time in the area of the memory, which is used for recording when the remaining capacity of the secondary battery drops below the second specified remainder.

The charge control device of the invention further comprises a temperature detection circuit including a temperature detecting element, and the control means lowers the voltage in constant voltage charging when the temperature detected by the temperature detection circuit is higher than a specified temperature.

The charge control device of the invention further comprises a temperature detection circuit including a temperature detecting element. The control means also raises the value of charge stopping current in constant voltage charging when the temperature detected by the temperature detection circuit is higher than a specified temperature.

DETAILED DESCRIPTION OF THE INVENTION

Preferred Embodiment 1

Figure 1:
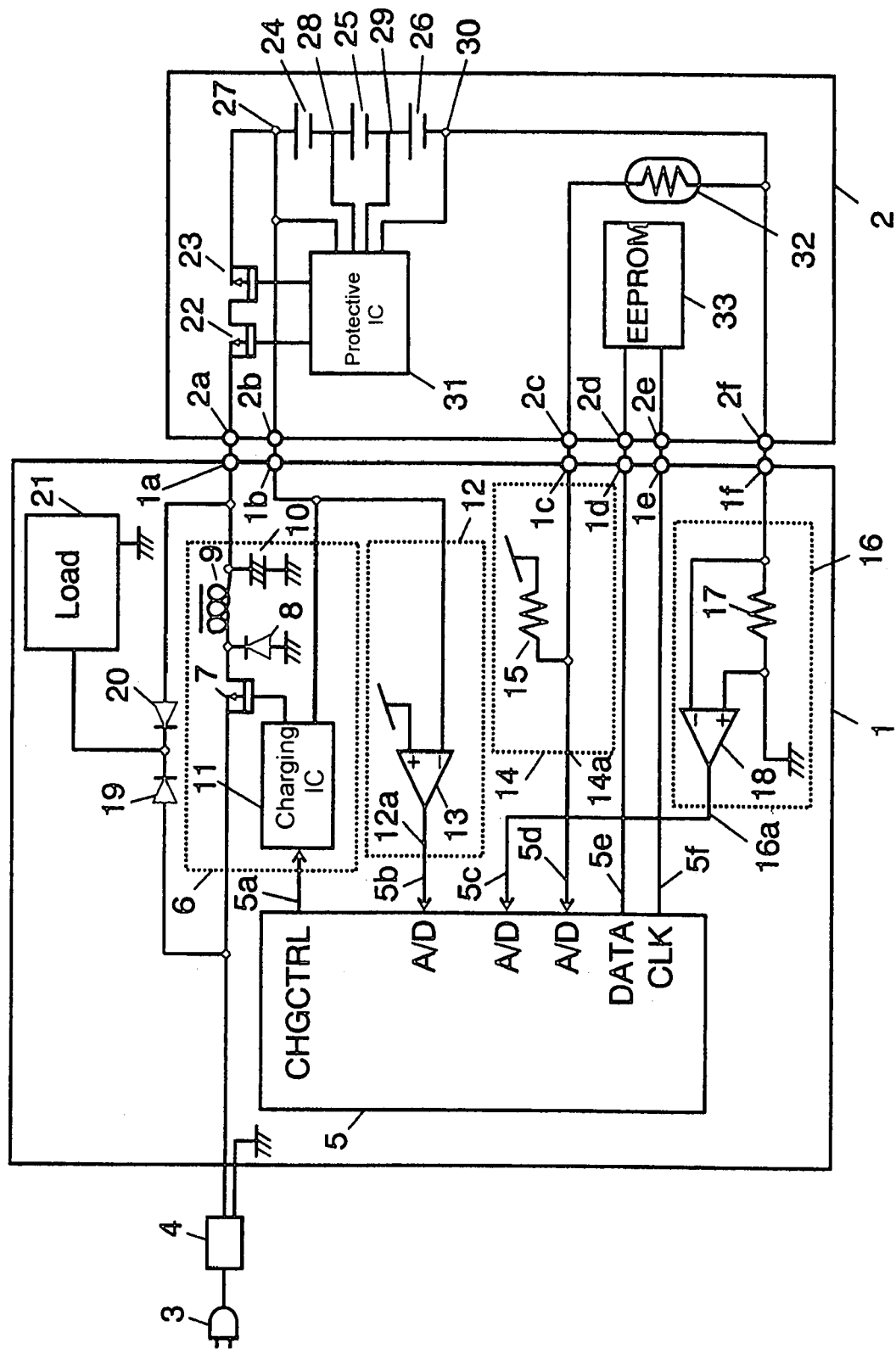
FIG. 1 is a circuit diagram of charge control device in preferred embodiment 1 of the invention.
Figure 2:
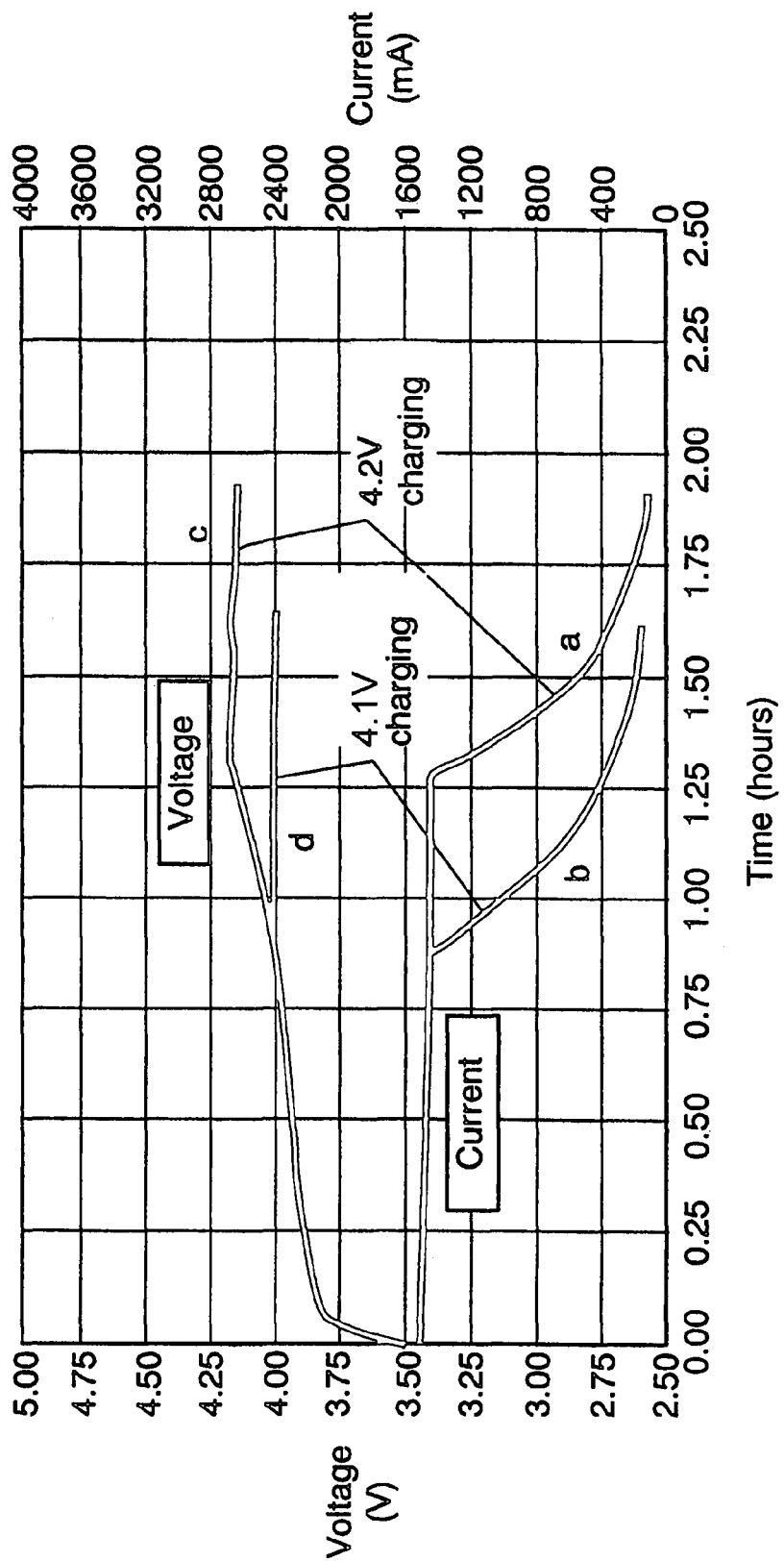
FIG. 2 is a charge characteristic diagram of lithium ion secondary battery in preferred embodiment 1.
Figure 3:
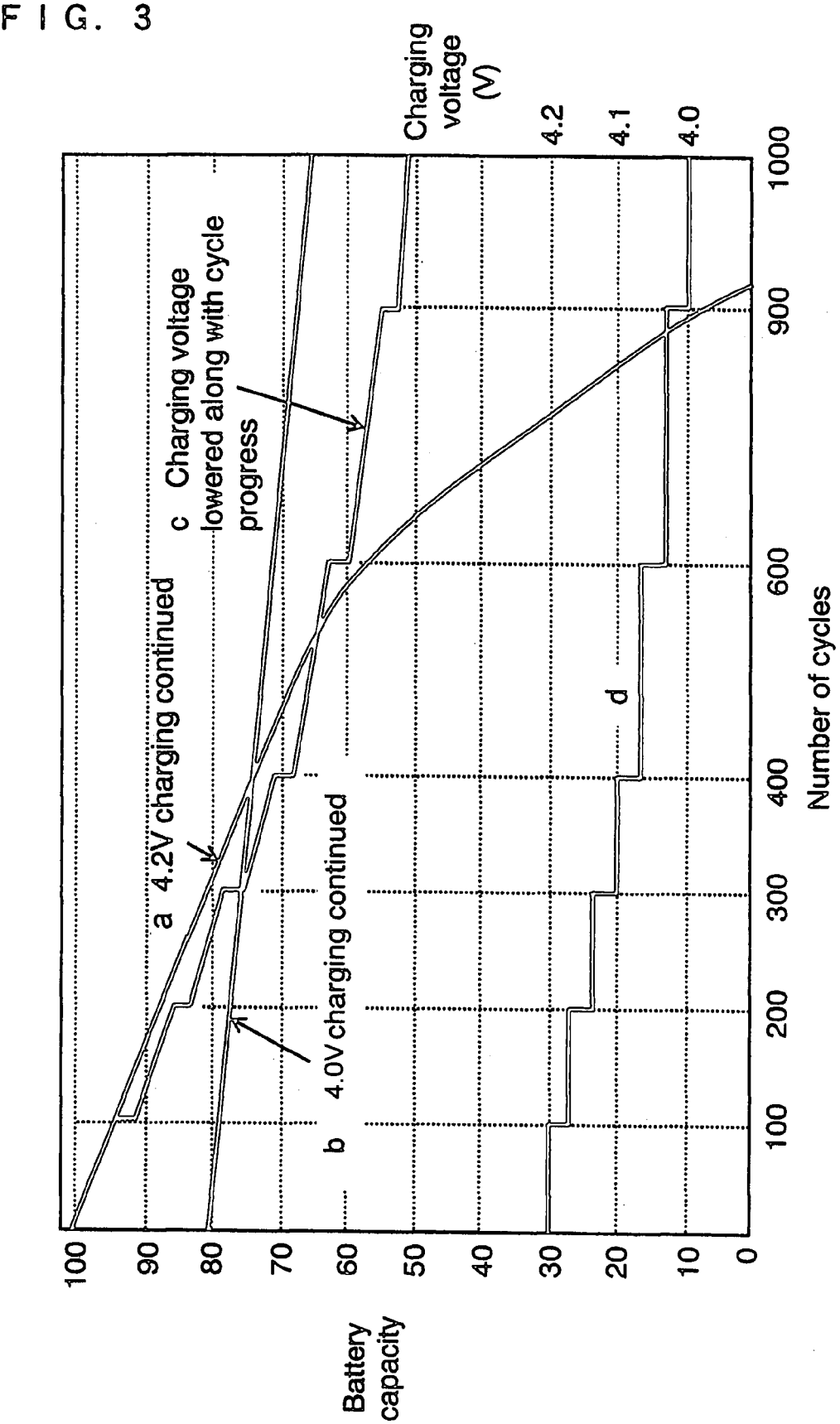
FIG. 3 is a charge and discharge cycle characteristic diagram of battery by difference in charging voltage of lithium ion secondary battery in preferred embodiment 1.

The charge control device in preferred embodiment 1 of the invention is described below while referring to the accompanying drawings. FIG. 1 is a circuit diagram of the charge control device. FIG. 2 is a charge characteristic diagram of lithium ion secondary battery used in the charge control device. FIG. 3 is a charge and discharge cycle characteristic diagram of battery by difference in charging voltage of lithium ion secondary battery in preferred embodiment 1. FIG. 4 is an explanatory diagram of counting method of charge and discharge cycles of the lithium ion secondary battery.

The structure shown in FIG. 1 may be roughly divided into main body 1 and battery pack 2 of the charge control device. These two blocks are mutually connected detachably by means of terminals $1a$ to $1f$ at the side of main body 1, and terminals $2a$ to $2f$ corresponding to the side of battery pack 2.

A specified voltage is supplied to main body 1 of the charge control device by way of power supply unit 4 from alternating-current commercial power source 3. Power supply unit 4 may drop the voltage by using a transformer or by using a switching power source, and is not particularly specified in structure or configuration.

In main body 1, microcontroller 5 has a function of a control means. Incorporating a control program not shown in its inside, it receives data from various parts mentioned below, and controls the operation of the parts.

Charge circuit 6 is interposed in series to power supply unit 4, and comprises field effect transistor (FET) 7 for controlling its input current, diode 8 for generating a current path when FET 7 is turned off, coil 9 and capacitor 10 for applying a smoothed input current to terminal $1a$, and charging IC 11 for controlling FET 7 by receiving control from charge control signal $5a$ (CHGCTRL) of microcontroller 5.

The voltage detection circuit 12 has operational amplifier 13, and detects a terminal voltage of secondary battery from terminal $1b$, and gives voltage detection signal $12a$ to terminal $5b$ (A/D) of microcontroller 5.

Temperature detection circuit 14 has resistor 15, and detects the temperature of battery pack 2 from terminal $1c$, and gives temperature detection signal $14a$ to terminal $5d$ (A/D) of microcontroller 5.

Current detection circuit 16 comprises resistor 17 for detecting the charging current from terminal $1f$, and operational amplifier 18 for detecting the voltage across resistor 17 and giving current detection signal $16a$ to terminal $5c$ (A/D) of microcontroller 5.

The input side of FET 7 and output side of coil 9 are connected to load 21 by way of diodes 19, 20. That is, diode 19 and diode 20 are reversely connected to each other, and a common cathode connection point of diodes 19, 20 is coupled to load 21. As a result, while charging battery pack 2, load 21 can be operated. While being connected to alternating-current commercial power source 3, a supply voltage is applied to load 21 by way of diode 19. When alternating-current commercial power source 3 is cut off, a supply voltage is applied to load 21 from secondary batteries 24, 25 and secondary battery 26 by way of diode 20. Of course, after completion of charging of battery pack 2, battery pack 2 may be separated from main body 1, and connected to load 21.

In battery pack 2, FET 22, 23 are disposed in series to influent path of input current from terminal $2a$, and connected to positive (+) electrode of secondary battery 24. FET 22 controls the charging current of secondary batteries 24, 25, and 26, and FET 23 controls the discharging current of them.

Secondary batteries 24, 25 and secondary battery 26 are connected in series. By detecting the voltage at both ends 27, 28, 29, and both ends 30 of secondary batteries 24, 25, and secondary battery 26, FET 22 is controlled by detecting the voltage is higher than specified voltage (overcharge) in any cell of secondary batteries 24, 25 and secondary battery 26. FET 22 has the purpose of cutting off the input current flowing in from terminal 2*a*. There is also protective IC 31 for controlling FET 23 and cutting off current supply by detecting that the voltage is lower than specified voltage (overdischarge) across secondary batteries 24, 25 and secondary battery 26.

In addition to charging IC 11, protective IC 31 is provided in order to protect the secondary battery by controlling FET 22 and stopping power supplied when the battery is overdischarged due to trouble of FET 7, malfunction of charging IC 11, or connecting of current pack 2 to wrong main body.

When battery pack 2 is connected to main body 1 or load 21 and laid up for a long period, secondary batteries 24, 25 and secondary battery 26 may be overdischarged due to slight discharge current supplied from main body 1 or load 21, but in order to avoid such state, the discharge path is cut off by FET 23, and the secondary batteries are protected.

If a current exceeding a specified value flows due to short-circuiting of battery terminals of secondary batteries 24, 25 and secondary battery 26, by controlling FET 23 and turning off, short-circuit protective function is realized. The OFF state of FET 23 is maintained up to next charging operation.

Further in battery pack 2, a series circuit of temperature detection circuit 14 and resistor 15 is formed, and it further comprises thermistor 32 for detecting the temperature of secondary batteries 24, 25 and secondary battery 26 adjacent to part of the element of temperature detection circuit 14, and EEPROM 33, which is a memory for storing the charge cycle count or total charge integrated value given by way of terminals 5*e*, 5*f* of microcontroller 5.

Operation of these parts is explained. Voltage detection circuit 12 detects the voltage across the secondary battery from terminal 1*b*, and issues analog voltage detection signal 12*a*, which is put into terminal 5*b* and converted into digital value. Temperature detection circuit 14 issues analog temperature detection signal 14*a* according to potential dividing ratio of thermistor 32 of which resistance changes with the temperature and resistor 15, and it is put into terminal 5*d* and converted into digital value.

Current detection circuit 16 calculates the current value by operational amplifier 18 from the voltage across resistor 17, and issues analog current detection signal 16*a*, which is put into terminal 5*c* and converted into digital value.

Charging IC 11 forming part of charge circuit 6 controls FET 7 on the basis of charge control signal 5*a* (CHGCTRL) of microcontroller 5 by calculating voltage detection signal 12*a*, temperature detection signal 14*a*, and current detection signal 16*a*, and controls at constant charging current to the secondary battery.

FIG. 2 shows the charging characteristic of lithium ion secondary battery. In FIG. 2, curve a and curve b are characteristics showing changes of charging current in relation to the charging time. Curve a shows the characteristic of 4.2 V charging per cell, and curve b shows the characteristic of 4.1 V charging per cell. Curve c and curve d show changes of charging voltage in relation to the charging time. Curve c shows the characteristic of 4.2 V charging per cell, and curve d shows the characteristic of 4.1 V charging per cell.

Microcontroller 5 sets charge control signal 5*a* in initial phase of charging, and puts into charging IC 11, and controls the output current from charge circuit 6, that is, the charging current at a specified value, for example, conforming to the flat portion of curves shown in FIG. 2, thereby carrying out CC charging. In this case, the specified charging current value is predetermined in the control program of microcontroller 5, depending on the charging condition of the battery to be charged, charging state or other characteristics.

Microcontroller 5 controls FET 7 through charging IC 11, and monitors voltage detection signal 12*a* and current detection signal 16*a* during CC charging, and when the battery voltage reaches a specific value (for example, 4.2 V per cell), while maintaining this specific value, charge control signal 5*a* is changed over and controlled in multiple stages or continuously, and the charging current of the output of the FET 7 is gradually decreased according to curve a in FIG. 2 (CV charging).

When the charging current becomes smaller than specified current value, judging to be fully charged state, charge control signal 5*a* is set to zero by turning off FET 7 by way of charging IC 11, and charging operation is over.

This is, the charging method by fixing the specific voltage (4.2 V in this case) per cell when judging the point of transfer from CC charging to CV charging in preferred embodiment 1. As mentioned earlier, however, the higher the charging voltage in CV charging, the higher becomes the filling rate of charging. Thus, the appliance can be used for a long time using one charging, but the battery life is shortened. On the other hand, when the charging voltage is lower, the battery life is longer, but the filling rate is lower and the appliance can be used for a shorter time by one charging.

FIG. 3 shows computer simulation of charge and discharge cycle characteristic of lithium ion secondary battery. In FIG. 3, curve a shows the voltage of CV charging at 4.2 V. Supposing 50% of battery capacity to be the end of life, it is about 650 cycles.

Curve b shows the voltage of CV charging at 4.0 V, and the initial filling rate is only 80%, but the life is far more than 1,000 cycles.

In curve c shown in FIG. 3, like curve d, charging of first 100 cycles is CV charging at charging voltage of 4.2 V, CV charging voltage in next 100 cycles is lowered by ⅓ V, CV charging voltage in further 100 cycles is lowered by ⅓ V, and thus the charging voltage is gradually lowered along with the progress of charging cycles, and the filling rate decreases as shown in FIG. 3. As compared with curve a, the initial filling rate is similar, and it is expected a life of more than 1,000 cycles may be obtained as compared with curve a showing rapid drop along with the number of cycles.

Figure 4A:
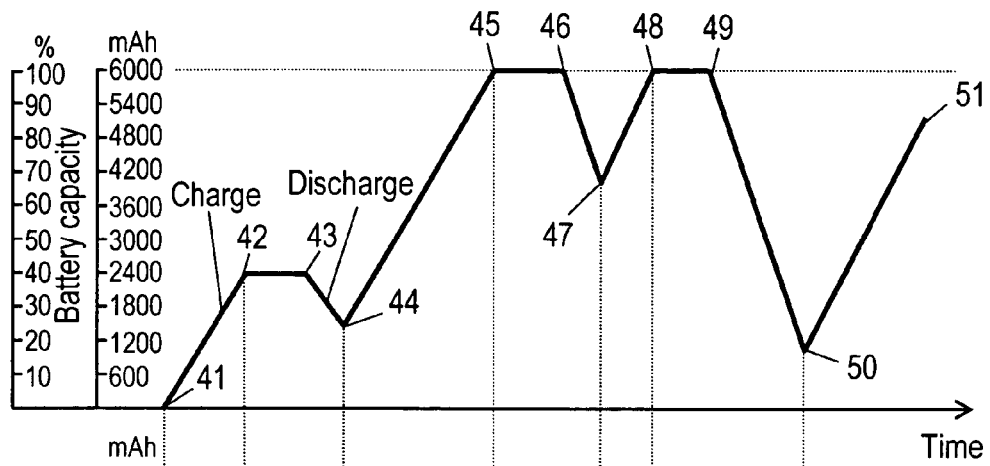
FIG. 4 is an explanatory diagram of counting method of charge and discharge cycles of lithium ion secondary battery in preferred embodiment 1.

FIG. 4 shows the cycle counting method. Every time the charge integrated value exceeds the fully charged capacity, one cycle is counted. In actual charge and discharge, once charged fully, the battery is hardly used up completely. As shown in FIG. 4A, the battery is charged from point 41 to point 42, and discharged slightly from point 43 to point 44, stopped in use before going empty, and charged again from point 44 to point 45.

Figure 4B:
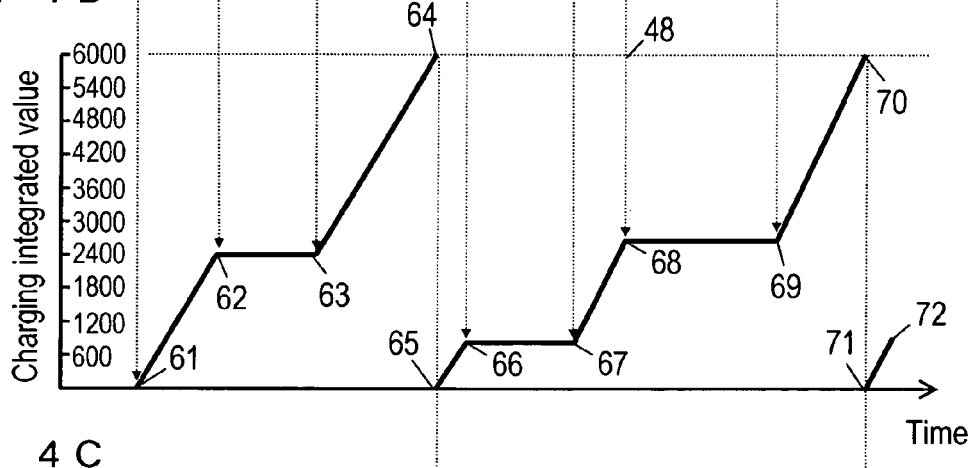
Figure 4C:
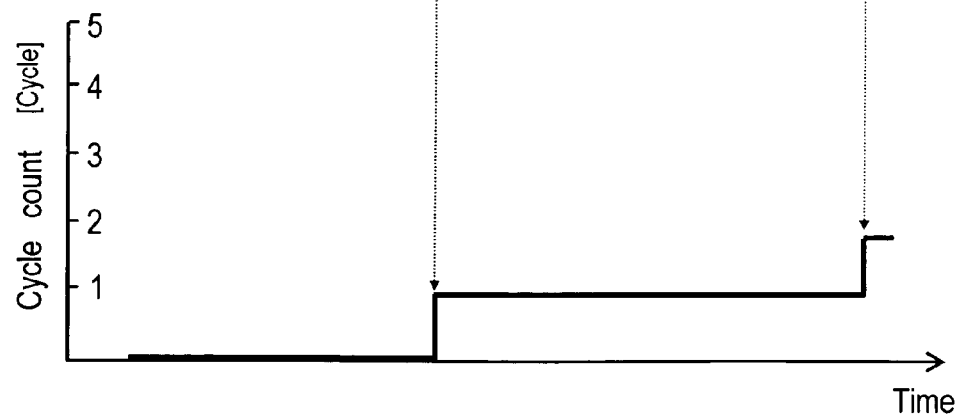

In this case, as the effective value of charge cycle counting, charge from point 41 to point 42 corresponds to point 61 to point 62 in FIG. 4B. Ignoring the discharge portion, the charge portion from point 44 to point 45 corresponds to the portion from point 65 to point 66, in addition to the portion from point 63 to point 64 in FIG. 4B, and one cycle is counted up at point 64 as shown in FIG. 4C. Similarly, reaching point 70 in FIG. 4B at intermediate point from point 50 to point 51 in FIG. 4A, the cycle count is 2 at this time. The point at point 51 corresponds to point 72 in FIG. 4B.

It is known that the life is not significantly different if counted in this manner, and in preferred embodiment 1, the number of cycles is counted in this manner, and according to the cycle counting, microcontroller 5 increments the number of counts of EEPROM 33 from terminals 5e (DATA), 5f (CLK).

Instead of the counting number in FIG. 4, the total charge integrated value may be obtained, and divided by charge capacity 6000 mAh. In this case, the memory value in EEPROM 33 is the total charge integrated value, instead of the count number. Anyway, every time the charge cycles are accumulated, the actual charge capacity decreases, and an error is involved, but the count number is a guideline for setting the voltage of charging.

In preferred embodiment 1, when charging the secondary battery, microcontroller 5 refers to the count number or total charge integrated value, and charges while gradually decreasing the charging voltage in CV charging (as shown by curve d in FIG. 3) corresponding to the count number or the total charge integrated value leading up to the count value; thereby satisfies the specified purposes of enhancing the initial filling rate and extending the charge cycle life in a long span.

Temperature detection circuit 14 detects when the temperature is more than specified in secondary batteries 24, 25 and secondary battery 26 in battery pack 2, and sets the specific value of battery voltage in CV charging controlled by microcontroller 5 at a lower value than ordinary temperature, and thereby controls so as to suppress deterioration of cycle life.

Moreover, same effects are obtained when temperature detection circuit 14 controls to set higher the charge stopping current in CV charging by detecting a temperature higher than specified in secondary batteries 24 to 26 in battery pack 2.

Instead of EEPROM 33, flash memory or other memory capable of holding the storage state may be used.

In preferred embodiment, the lithium ion secondary battery is explained, but it maybe applied to secondary batteries having similar charging characteristics as lithium ion secondary battery.

For control of charge and discharge current, the FET of MIS type is used, but a bipolar transistor may be used, or semiconductor control element of other type may be also used.

Preferred Embodiment 2

Figure 5:
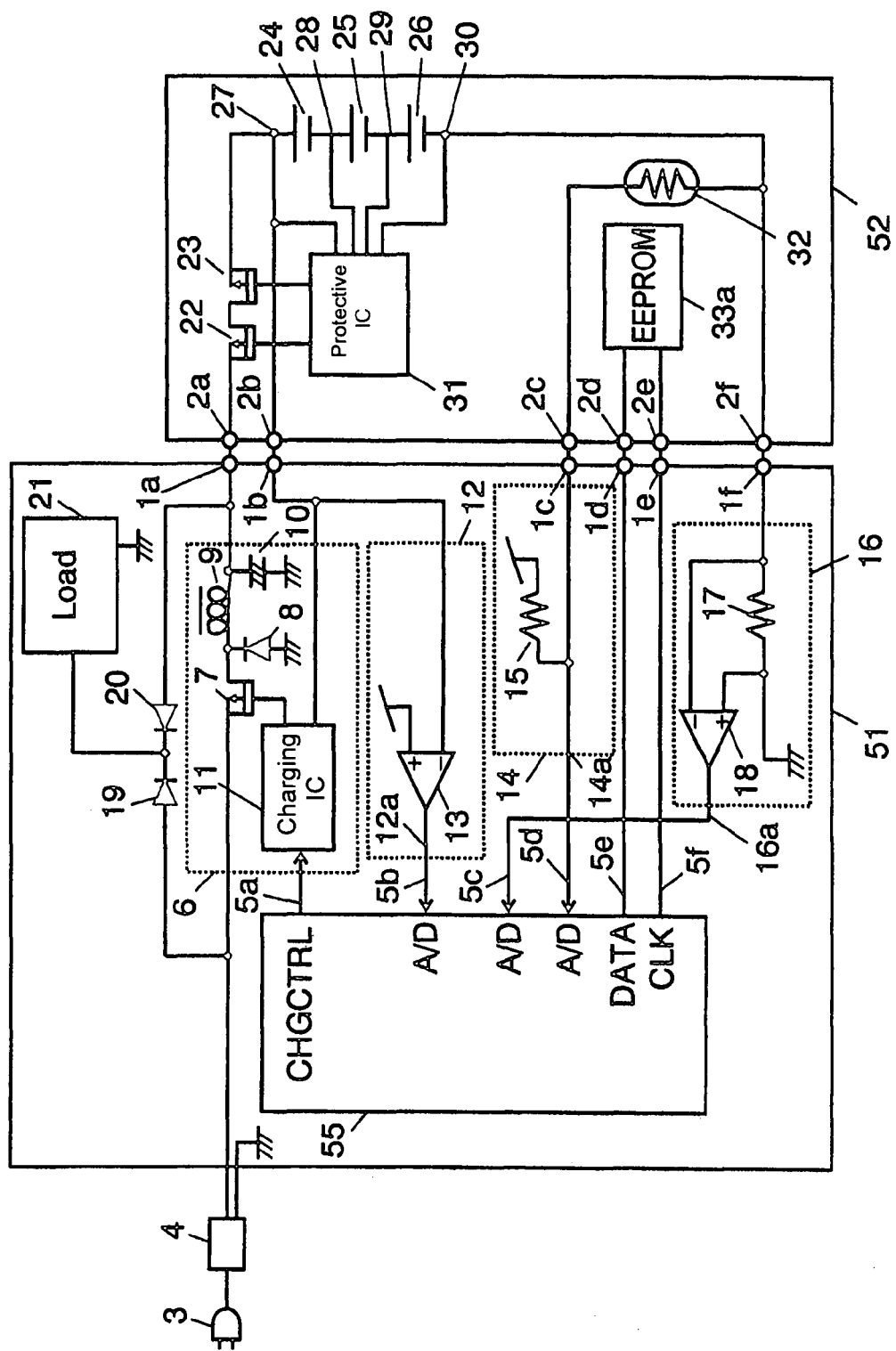
FIG. 5 is a circuit diagram of charge control device in preferred embodiment 2 of the invention.
Figure 6:
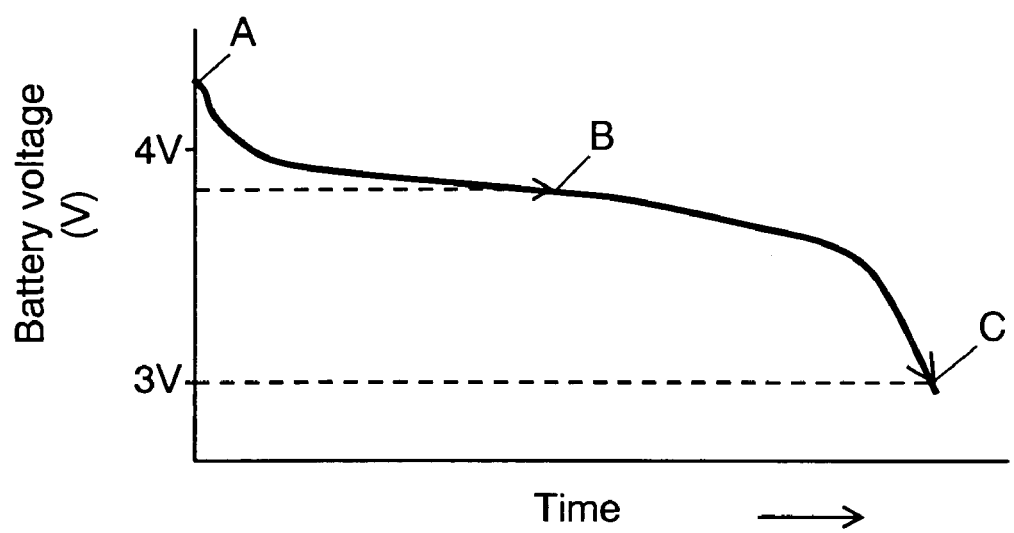
FIG. 6 is an explanatory diagram of state of use of rechargeable battery in preferred embodiment 2.

The charge control device in preferred embodiment 2 of the invention is described below while referring to the accompanying drawings. FIG. 5 is a circuit diagram of the charge control device, and FIG. 6 is an explanatory diagram of state of use of rechargeable battery. Preferred embodiment 2 refers also to FIG. 4 showing the charge and discharge cycle counting method of lithium ion secondary battery.

Due to the characteristics of a lithium ion secondary battery, its deterioration progresses, even if it is not used much. That is, the deterioration characteristics of the lithium secondary battery progress, even if the number of times of charging and discharging is small or kept in charged state. In particular, deterioration is very quick when the battery voltage is maintained in high state. For example, when used in AC floating state by connecting to the AC power supply and using while charging, it is used in a range from point A to point B of battery capacity of 50%, for example, as shown in FIG. 6, and a high voltage is always applied to the battery, and hence deterioration is quick. Deterioration also progresses when left in an overdischarged state. Accordingly, the lithium ion secondary battery is shipped by charging to a filling rate of about 30% after manufacture. That is, this degree of charging is considered to have smallest adverse effects on the battery life.

Preferred embodiment 2 relates to charge control corresponding to state of use by repeating charge and discharge at short intervals and frequently. For example, it relates to charge and discharge control of state of use of using in AC floating state, charging fully, discharging slightly, and charging again. That is, in the state of use quick in deterioration of battery after continued high filling rate state, it is intended to obtain the contradictory effects of charging at high filling rate initially, and long charge cycle life in a long span.

In FIG. 5, what differs from FIG. 1 relating to preferred embodiment 1 lies in the function of microcontroller 55 of main body 51 and EEPROM 33a of battery pack 52. The structure and function identified in FIG. 1 are identified here with same reference numerals and explanation of that structure and function is omitted.

In FIG. 5, EEPROM 33a of battery pack 52 includes an area for storing the total number of charges (cycle count) show in FIG. 4C in preferred embodiment 1, and also an area for storing the number of times of reaching full charging in charging at small intervals in FIG. 4A, for example, counting point 45 and point 48 as one, and storing two counts as one full charge in this example.

Two counts of the number of times of full charge are shown in FIG. 4. The cycle count in FIG. 4C is counted every time the charge integrated value exceeds the full charge capacity of the battery, as defined in preferred embodiment 1. The cycle count remains at 1 until exceeding at point 50 in FIG. 4A. Therefore, supposing the number of times of full charge to be n and the complete cycle count to be m (i.e., every time the charge integrated value exceeds the full charge capacity) n/m=2/1=2 is obtained. The greater the ratio, the more frequent the charging, and the battery capacity is hardly used up. Thus, a high battery voltage may be maintained, and in such a case it is controlled to decrease the charging voltage value for transfer from CC charging to CV charging.

Referring now to FIG. 3, when lowering the charging voltage value for transfer from CC charging to CV charging by one stage in 100 cycles of total number of times of charge (cycle count), for example, the n/m ratio is calculated 30 cycles earlier, and if it is 3 or more, for example, the charging voltage value is lowered by one stage.

If the n/m ratio is 3 or less, the n/m ratio is calculated again at 50 cycles, and if it is 2 or more, the charging voltage value is lowered by one stage.

If the n/m ratio is 2 or less, the charging voltage value is lowered by one stage at 100 cycles, and thus depending on the n/m ratio, the interval of decreasing the charging voltage value by one stage is varied.

Further, by narrowing the width of stage for changing the charging voltage value, the number of stages for changing once corresponding to the n/m ratio may be increased.

Thus, in preferred embodiment 2, corresponding to the state of use of repeating charge and discharge at short intervals and frequently, the charging voltage value for transfer from CC charging to CV charging is decreased earlier, or the width of the stage of lowering the charging voltage value is widened, so that the battery life can be extended depending on the actual state of use while maintaining a high initial filling rate.

The configuration of preferred embodiment 2 may be combined with the configuration of preferred embodiment 1 of lowering the charging voltage depending on the number of charge cycles or the total charge integrated value, so that more flexible control suited to the actual state of use may be realized.

Preferred Embodiment 3

Figure 7:
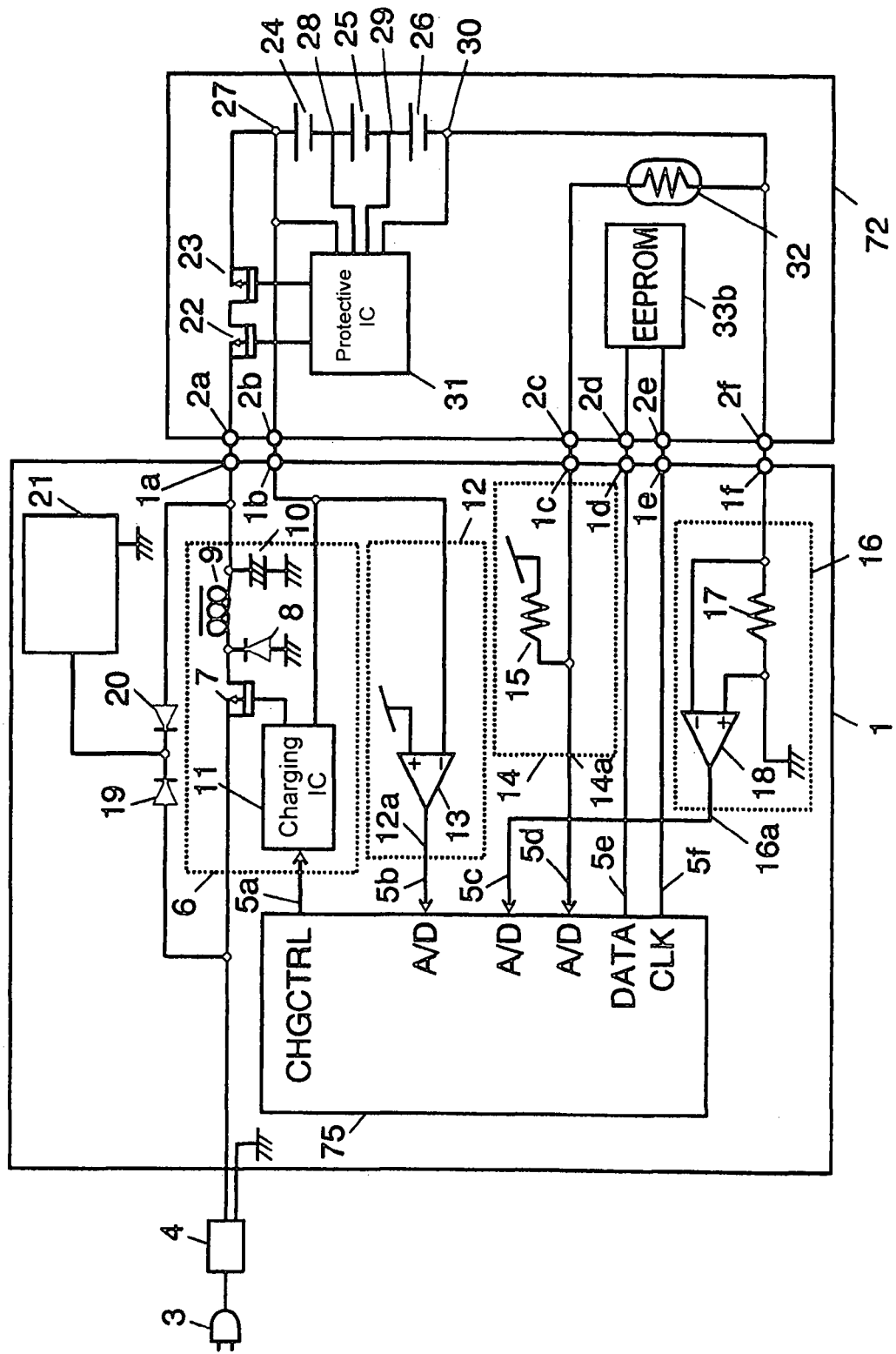
FIG. 7 is a circuit diagram of charge control device in preferred embodiment 3 of the invention.
Figure 8:
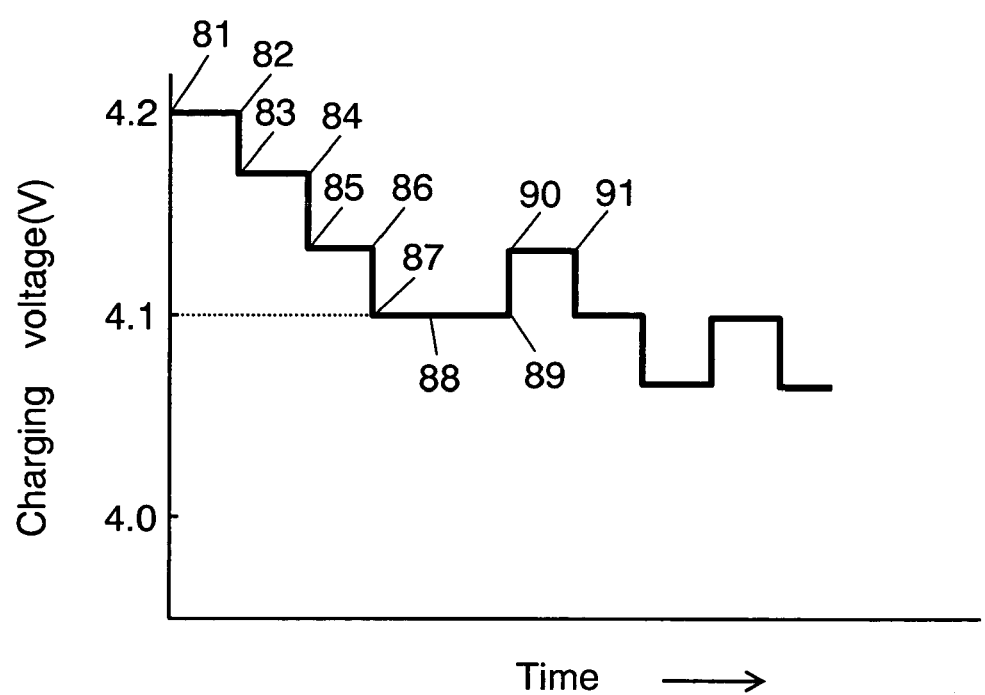
FIG. 8 is an explanatory diagram showing an example of setting of voltage value for transfer from CC charging to CV charging corresponding to the duration of use of rechargeable battery in preferred embodiment 3.

The charge control device in preferred embodiment 3 of the invention is described below while referring to the accompanying drawings. FIG. 7 is a circuit diagram of the charge control device, and FIG. 8 is an explanatory diagram showing an example of setting of voltage value for transfer from CC charging to CV charging corresponding to the duration of its use.

Due to the characteristics of a lithium ion secondary battery, as mentioned above, its deterioration progresses if not used much. That is, the deterioration characteristics of the lithium secondary battery progresses, even if the number of times of charging and discharging is small or kept in charged state. In consideration of such characteristic of lithium ion secondary battery, in preferred embodiment 3, it is intended to decrease gradually the charging voltage value for transfer from CC charging to CV charging depending on the duration of use from start of secondary battery. Therefore, it is possible to obtain the contradictory effects of charging at high filling rate initially, and long charge cycle life in a long span.

In FIG. 7, what differs from FIG. 1 relating to preferred embodiment 1 lies in the function of microcontroller 75 of main body 71 and EEPROM 33b of battery pack 72. The structure and function identified in FIG. 1, are identified here with same reference numerals and explanation of that structure and function is omitted.

EEPROM 33b of battery pack 72 includes a first specific area for storing the time information, and second and third specific areas for storing whether the battery voltage is lowered from specified voltage or not. Microcontroller 75 of main body 71 has a clock function, and writes time information in the first specific area of EEPROM 33b, and writes whether or not lowered from the first specified voltage within a specified time in the second specific area. In the third specific area, it has a function of writing whether or not lowered from the second specified voltage within a specified time, and reading them out.

When battery pack 72 is installed in main body 71 of the charge control device, microcontroller 75 refers to the first specific area of EEPROM 33b. If time information is not written in the specific area, it is judged that the battery pack is new and not used, and time information is written in the first specific area.

Microcontroller 75 always refers to the time information of EEPROM 30b, and calculates the time (duration) after start of use from the stored time information and the present time. At the same time, from the detection result of voltage detection circuit 12, it is determined if the battery voltage is lowered from a first specified voltage or not within a specified time. If not becoming lower than specified voltage ever, this information is written in second specific area of EEPROM 33b.

If the battery voltage is maintained over first specified voltage for specified time, Microcontroller 75 compares with a table not shown, and lowers the charging voltage value for transfer from CC charging to CV charge by each specified width in every specified time.

The first specified voltage is, for example, the voltage at point B shown in FIG. 6 at battery capacity of 50%. That is, this point shows both the battery voltage and first specified remainder of battery. When the battery voltage is maintained over the specified voltage for specified time, and it is judged that nothing is recorded in second specific area of EEPROM 33b, recording in second specific area is cleared, and the charging voltage value is lowered by one stage. This specified time and lowering width of specified voltage value are desired to be determined experimentally to determine optimum values depending on the battery characteristics and conditions of use in the appliance.

In FIG. 8, the charging voltage value at point 81 starts from 4.2 V, a specified time has passed at point 82, and microcomputer 75 detects that the battery voltage has maintained over the first voltage in this period from a specific area in EEPROM 33b, then the charging voltage is lowered by one step. The range of points 83 to 87 is maintained over the specified voltage of the battery voltage, and hence the charging voltage is lowered by gradual steps.

Thus, when the battery voltage is maintained over a specified value in a specified time, the battery life can be extended by gradually lowering the charging voltage along with the time.

When microcontroller 75 detects drop below first specified voltage or first specified remainder within specified time from recording in second specific area of EEPROM 33b, it clears the recording in second specific area and maintains the charging voltage value.

That is, from point 87 to 88 in FIG. 8, since it has detected drop below first specified voltage or first specified remainder within specified time, the charging voltage is maintained up to point 89.

Further, when microcontroller 75 detects even only once drop of battery voltage within specified time range to second specified voltage in FIG. 6 lower than first specified voltage, for example, below discharge terminal voltage of 3V at point C from the detected value of voltage detection circuit 12, it is written into third specific area in EEPROM 33b. That is, this point shows both battery voltage and the second specified remainder of the battery.

When microcontroller 75 detects drop below second specified voltage or second specified remainder within specified time from recording in third specific area of EEPROM 33b, it clears the recording in third specific area and lowers the charging voltage value by one step.

That is, from point 88 to 89 in FIG. 8, since it has detected drop below second specified voltage within specified time, the charging voltage is raised by one step at point 89.

It is judged that the state of use is changed from the AC floating state to ordinary secondary battery driving state, or that the battery is not charged for a long time.

From point 90 to 91, since it is detected that the battery voltage is maintained over the first voltage, the charging voltage is lowered by one step. Thereafter, similarly, drop, maintenance, and raising of charging voltage are repeated.

The discharge terminal voltage at point C shown in FIG. 6 is set at remaining 10%, for example, of the battery capacity, but this setting point is large in change depending on the temperature and operating current, and microcontroller 75 corrects by referring to a table not shown depending on the detection results of temperature detection circuit 14 and current detection circuit 16.

The specified time in preferred embodiment 3 may be set gradually longer along with the duration after start of use of the battery.

When detecting below first voltage and below second voltage in a specified time, the latter is dominant.

Or when detecting below second voltage, the user may judge that a necessary charging amount is needed, and may immediately raise the charging voltage to the initial 4.2 V.

Thus, in preferred embodiment 3, when the battery voltage is over the first specified voltage within a specified time after start of use by recording the start time of use of battery, the charging voltage value for transfer from CC charging to CV charging is decreased in gradual steps. When the battery voltage becomes below the first specified time within specified time, the charging voltage value for transfer from CC charging to CV charging is maintained.

When the battery voltage is below second specified voltage within specified time, the charging voltage value for transfer from CC charging to CV charging is raised, and this control is repeated. As a result, while keeping a high initial filling rate, the battery life can be extended depending on the state of use.

The configuration of preferred embodiment 3 may be combined with the configuration of preferred embodiment 1 of lowering the charging voltage depending on the number of charge cycles or the total charge integrated value, so that more flexible control suited to the actual state of use may be realized. Meanwhile, as explained in preferred embodiment 1, as the operation of temperature detection circuit 14, when it is detected that secondary batteries 24 to 26 in battery pack 2 are higher than specified temperature, the specific value of battery voltage of CV charging controlled by microcontroller 5 is set lower than in the case of ordinary temperature, and it is controlled to suppress deterioration of cycle life, and such configuration can be also applied in preferred embodiments 2 and 3.

Further, as explained in preferred embodiment 1, as the operation of temperature detection circuit 14, when it is detected that secondary batteries 24 to 26 in battery pack 2 are higher than specified temperature, it is controlled to set higher the charge stopping current in CV charging, and such configuration can be also applied in preferred embodiments 2 and 3.

In the foregoing preferred embodiments, the charging voltage for transfer from CC charging to CV charging is controlled in gradual steps, but it can be also controlled continuously.

As explained herein, according to the charge control device of the invention, in lithium ion secondary battery or other secondary battery having similar charging characteristic, the charging voltage in CV (constant voltage) charging transferred from CC (constant current) charging is controlled to be higher in initial phase of charging cycle, and lowered in every specific charging cycle. Further, depending on the degree of charge and discharge at small intervals, it is controlled to increase the degree of drop of charging voltage when transferred from CC charging to CV charging. Further, the charging voltage is controlled corresponding to the duration after start of use of secondary battery, or more specifically it is controlled to lower, maintain or raise the charging voltage when transferred from CC charging to CV charging depending on change of more than specified voltage or not within the specified duration after start of use of secondary battery. By these methods and means, while enhancing the initial filling rate of lithium secondary battery, a long charging cycle can be maintained for a long period. That is, the charge control device of the invention realizes both filling rate of secondary battery and long life of battery cycle, and hence an outstanding industrial applicability is realized.

The invention claimed is:

1. A charge control device comprising:
   a charge circuit for supplying a charging current to a secondary battery,
   a voltage detection circuit for detecting the voltage of the secondary battery,
   a current detection circuit for detecting the charging current to the secondary battery,
   a memory for recording a number of times of full charging the secondary battery, and a number of times a charge integrated value of the secondary battery exceeds a capacity of the secondary battery, and
   a controller for controlling the charge circuit, changing to a constant voltage charging after charging the secondary battery at a constant current, and decreasing a voltage for the constant voltage charging depending on a ratio of the number of times of full charging the secondary battery and the number of times the charge integrated value of the secondary battery exceeds the capacity of the secondary battery.

2. The charge control device of claim 1, wherein the number of times a charge integrated value of the secondary battery exceeds the capacity of the secondary battery is based on a value of a total charge integrated value of the secondary battery divided by the battery capacity.

3. The charge control device of claim 2, further comprising:
   a temperature detection circuit including a temperature detecting element,
   wherein said controller lowers the constant voltage charging when the temperature detected by said temperature detection circuit is higher than a specified temperature.

4. The charge control device of claim 2, further comprising:
   a temperature detection circuit including a temperature detecting element,
   wherein said controller raises a value of charge stopping current used for constant voltage charging when the temperature detected by said temperature detection circuit is higher than a specified temperature.

5. The charge control device of claim 1, further comprising:
   a temperature detection circuit including a temperature detecting element,
   wherein said controller controls to lower the voltage in constant voltage charging when the temperature detected by the temperature detection circuit is higher than a specified temperature.

6. The charge control device of claim 1, further comprising:
   a temperature detection circuit including a temperature detecting element,
   wherein said controller raises the value of a charge stopping current used for constant voltage charging when the temperature detected by said temperature detection circuit is higher than a specified temperature.

* * * * *